United States Patent [19]
Kocher

[11] Patent Number: 5,511,368
[45] Date of Patent: Apr. 30, 1996

[54] ROUGH TERRAIN HYDRAULIC MOWER ATTACHMENT

[76] Inventor: Norman E. Kocher, R.R. 2, Box 95, Lawrenceville, Ill. 62439

[21] Appl. No.: 375,600

[22] Filed: Jan. 20, 1995

[51] Int. Cl.⁶ .................................................. A01D 34/64
[52] U.S. Cl. ..................... 56/15.2; 56/15.7; 56/DIG. 14
[58] Field of Search ..................... 56/15.2, 10.9, 56/11.9, 15.1, 15.4, 15.5, 15.6, 15.7, 15.9, DIG. 11, DIG. 14

[56] References Cited

U.S. PATENT DOCUMENTS

| | | | |
|---|---|---|---|
| 3,665,685 | 5/1972 | Allard | 56/15.8 |
| 4,048,789 | 9/1977 | Cartner | 56/11.9 |
| 4,308,713 | 1/1982 | James | 56/6 |
| 4,697,404 | 10/1987 | Brockmeier et al. | 56/15.2 |
| 4,869,056 | 9/1989 | Lynch | 56/15.5 |
| 4,956,965 | 9/1990 | Parsons, Jr. | 56/15.2 |
| 5,341,629 | 8/1994 | Penner | 56/15.2 |
| 5,430,999 | 7/1995 | Grant | 56/15.2 |

*Primary Examiner*—Terry Lee Melius
*Assistant Examiner*—Heather Chun Shackelford

[57] ABSTRACT

A rough terrain hydraulic mower, with dual blades, attached in a non-rigid manner to a backhoe boom mounted on the towing tractor by way of a three point hitch arrangement.

5 Claims, 3 Drawing Sheets

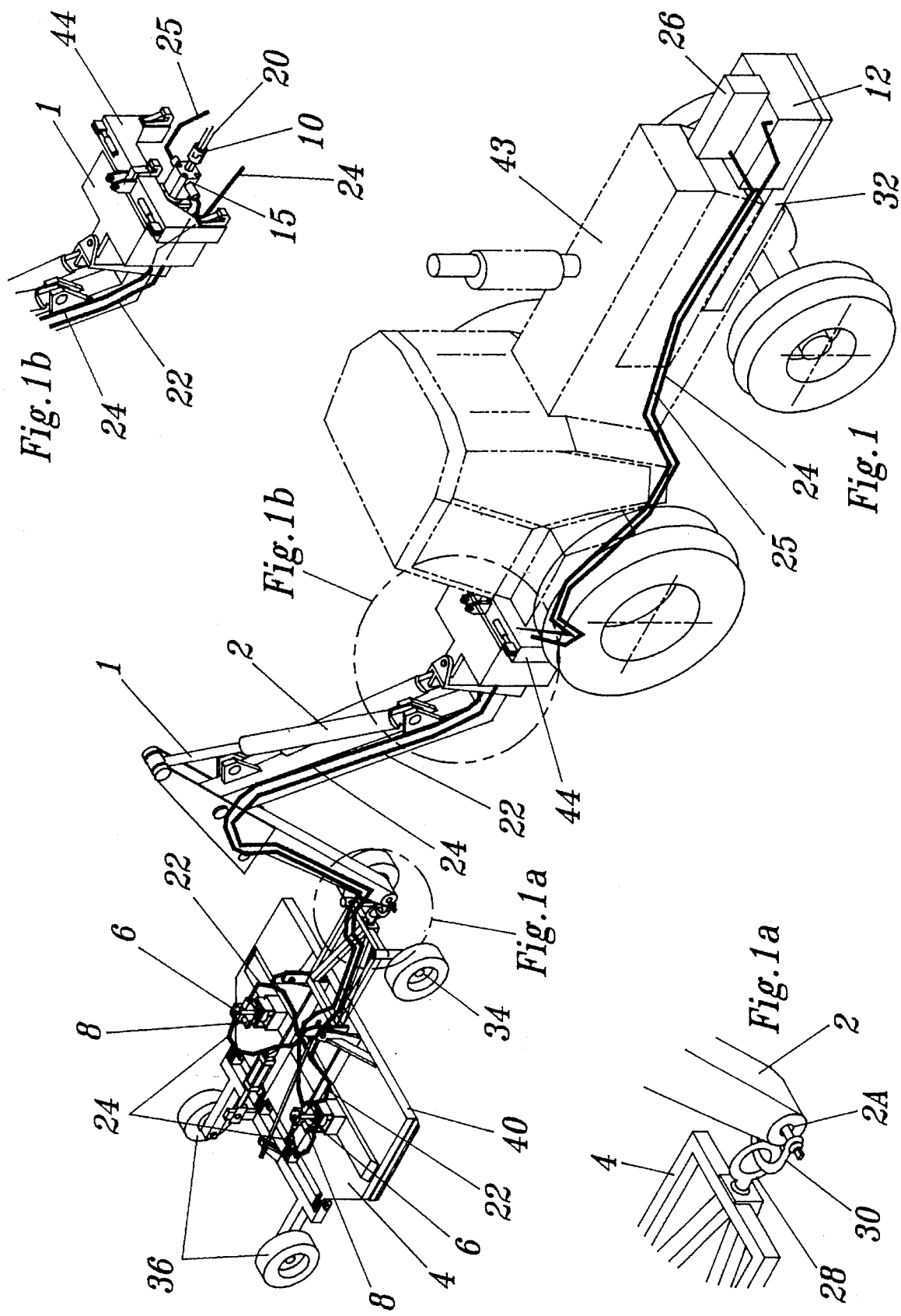

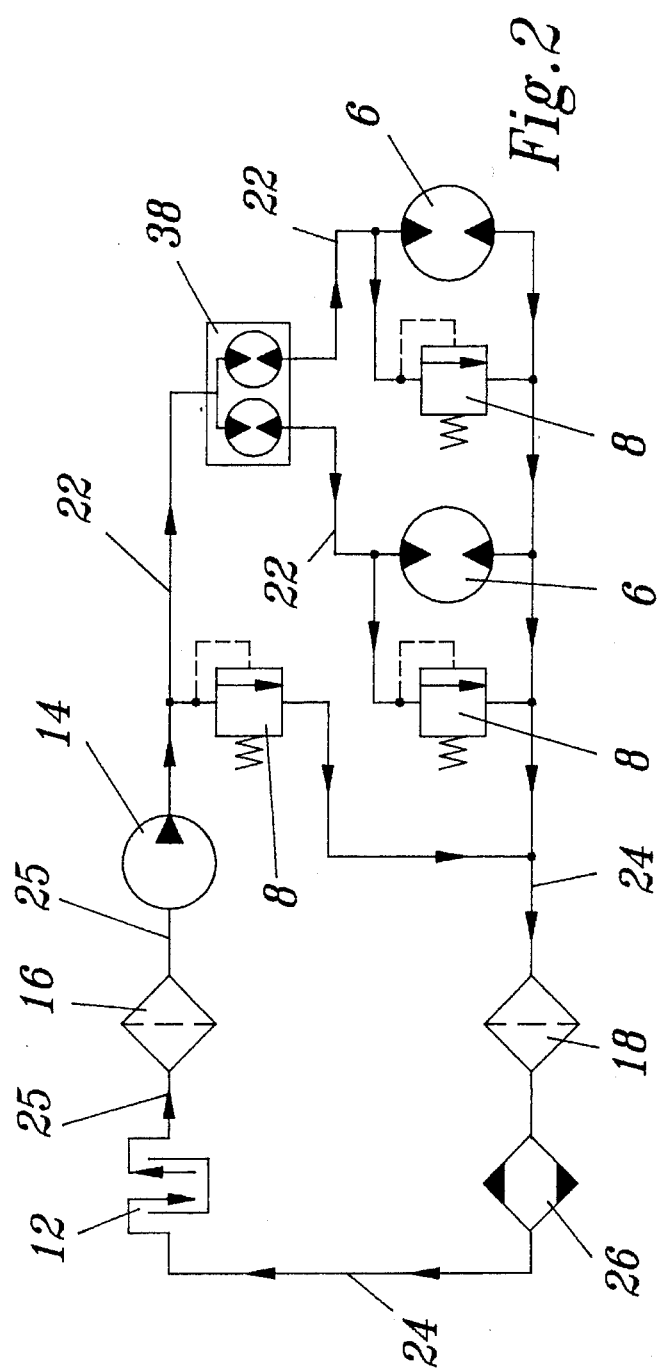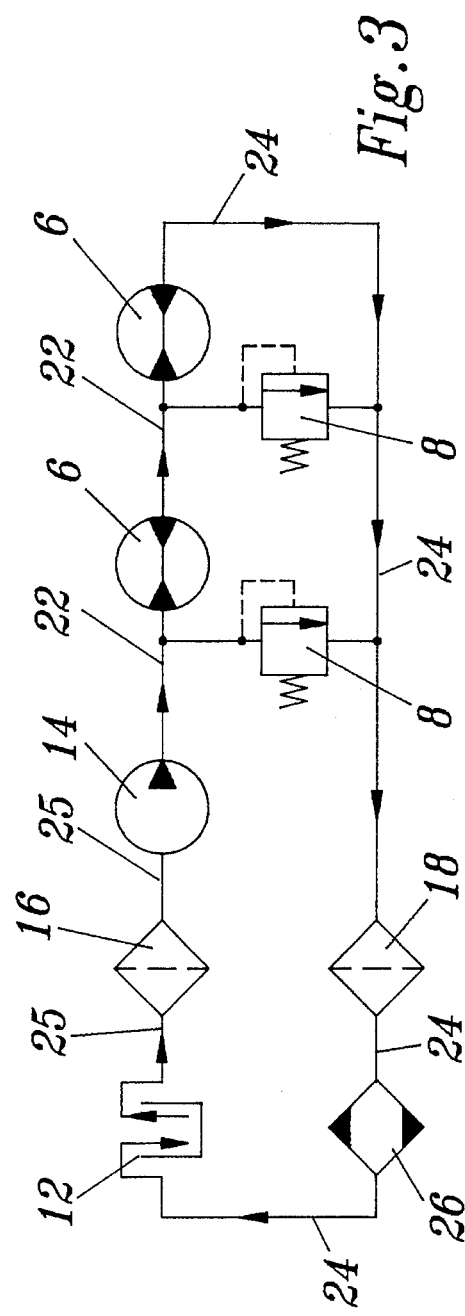

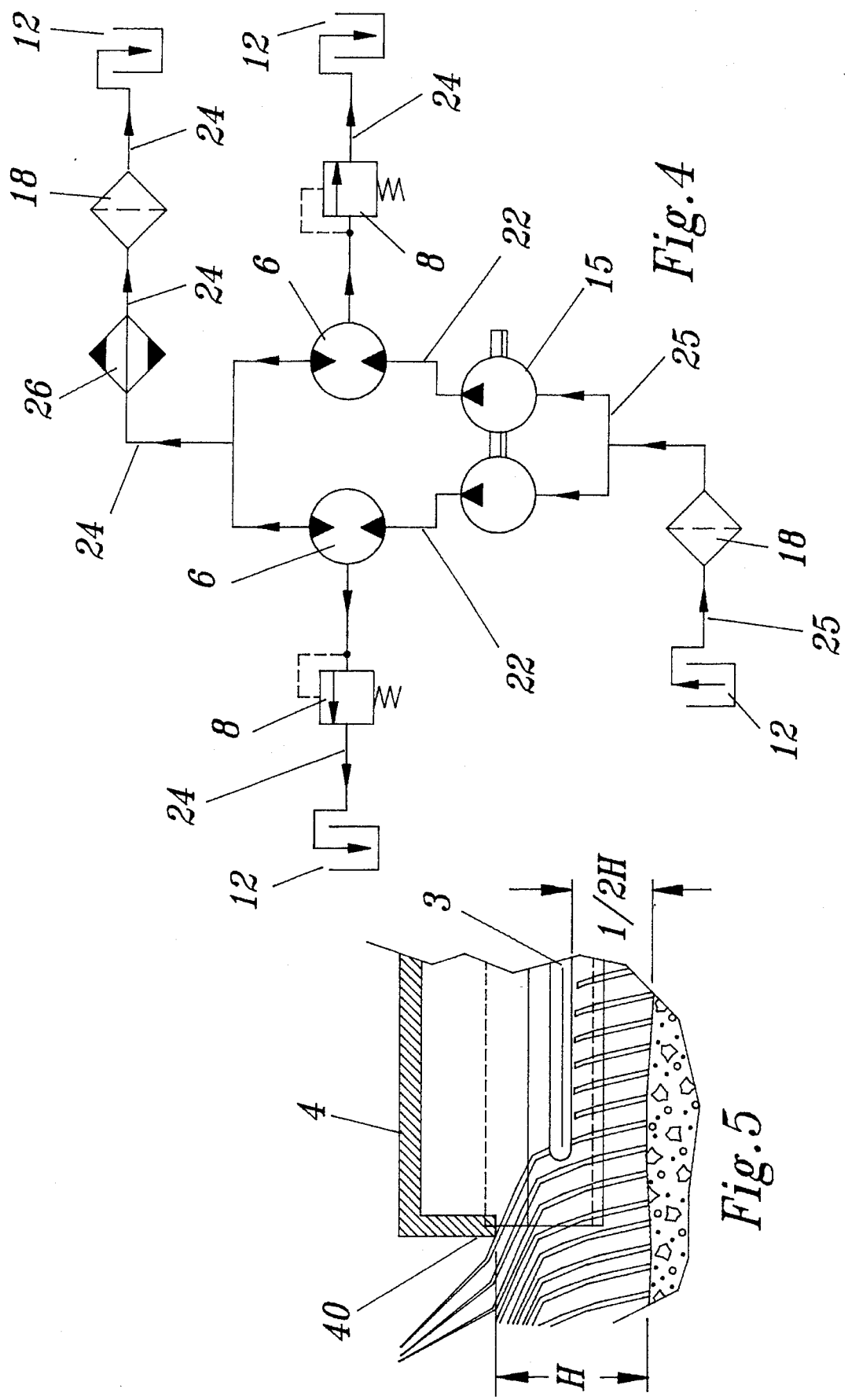

ROUGH TERRAIN HYDRAULIC MOWER ATTACHMENT

BACKGROUND—FIELD OF THE INVENTION

This invention provides an improved means of cutting grass, underbrush, and small trees growing on the side of levees, waterways, and ditches. The invention consists of a successful hydraulic circuit with two hydraulic motors driving two separate cutting heads with the mower deck modified to trail the tractor, while riding on the ground, mounted on a backhoe boom to permit improved vehicular maneuverability.

BACKGROUND—DESCRIPTION OF PRIOR ART

A patent search was conducted in Class 56, sub-classes 10.9, 11.9, 15.2, and 15.5. The folowing patents were discovered:

| | | |
|---|---|---|
| 3,045,413 | 07/24/1959 | Sheffer |
| 2,997,835 | 08/29/1961 | Stewart |
| 3,462,925 | 08/26/1969 | Lanier |
| 3,665,685 | 05/30/1972 | Allard |
| 3,729,910 | 05/01/1973 | Hardee |
| 3,949,539 | 04/13/1976 | Cartner |
| 4,048,789 | 09/20/1977 | Cartner |
| 4,206,580 | 06/10/1980 | Truax et al |
| 4,502,269 | 03/05/1985 | Cartner |
| 4,769,977 | 09/13/1988 | Milbourn |
| 4,802,327 | 02/07/1989 | Roberts |
| 4,996,830 | 03/05/1991 | Davison |
| 5,201,350 | 04/13/1993 | Milbourn |
| 5,174,098 | 12/29/1992 | Emery |

It is necessary to keep trees from growing on river levees, or else the tree root systems become extensive and weaken the levee, providing leakage paths for the water contained by the levee. To date, there has not been a good way to do this. Conventional mechanical mowers are not very maneuverable and don't mow the young trees and underbrush as well or as quickly as is desired. A common practice is to drag a bar or weighted beam across the levee to break down the trees. This is not very satisfactory either. This inventor did not start out to invent a better means of cutting the underbrush, trees and grass off the river levees. This inventor tried to buy a commercial mowing means to accomplish the above, and was informed by the "Woods" brand brush cutting mower manufacturer, that a hydraulic version of their type of mower did not exist, and was not practical for this application. So the inventor purchased a "Woods" brand dual spindle PTO shaft driven "bush hog" and proceeded to modify it to do the job. This inventor obtained, from a prominent Indiana based fluid power distributor, hydraulic motors, pumps, and other components that were supposed to do the job in a conventional way. The conventional, state of the art approach did not work. At that point the inventor improved on the state of the art approach until it worked very well, for the intended purpose. i.e. mowing heavy grass, underbrush, and small trees on levees and waterways and in ditches at several miles per hour.

There are reasons why no one has come up with a feasible tractor attachment for heavy duty rough terrain mowing to date. The hydraulic systems on agricultural tractors are usually sized for raising and lowering a tool. They are seldom sized for running hydraulic motors. (American Society of Agricultural Engineers, St. Joseph, Mich. Paper #921604, #Eliminate Agricultural Tractor PTO Driveline Accidents . . . ", George H. Morgan, Appendix C, 3rd par.) The tractor hydraulic system on the "Ford 8730 Power Shift" tractor, which is a large tractor, was adequate for operating the backhoe boom, but an additional hydraulic system had to be added to the vehicle to operate the mower. Where to hang the pump is a problem. Mobile hydraulic pumps typically operate most efficiently in the 2,000/3000 rpm range. The faster the rpms, the smaller the pump required for a given flow. However, there are only two places to put the pump. One is off the front crankshaft of the engine. The other is off the power take off, which is popularly known as the PTO. There are major problems, outlined in the above Appendix C, to hanging the pump off the front crankshaft. The typical PTO operates at either 540 rpm or 1,000 rpm. Those are not volumetricly or mechanically efficient speeds for gear pumps or axial piston pumps. The mower the inventor modified was a Woods, Division of Hesston Corporation, a manufacturer located in Oregon, Ill., Model 121 commercial two spindle mower. The recommended blade speed range was 730 or 1000 rpm, depending on whether the customer used a 540 rpm or a 1,000 rpm PTO speed according to their published literature. That recommended blade speed range is not an efficient range for gear motors or axial piston motors. As it is on the high side of the speed range of gerotor motors up to this time, making a hydraulic system work for this application is not as simplistic as portrayed by the patents uncovered to date. There has been some development of orbital gerotor motors as pumps to work in the 540 rpm range (Ref. ASAE Paper 921604 previously mentioned) but the manufacturer has only acheived relatively light applications to date. A gear pump with two gear motors and a valve type flow divider was the original recommendation by the hydraulic components supplier for converting the "Woods" mower from mechanical to hydraulic drive.

The valve type flow divider to split the flow between the two gear motors operating in parallel is the common type of flow divider in agricultural circles. But, it was a factor in the excess heat generated in the initial mowing trials. An explanation for this problem is found in Appendix A, of the Paper #911596 "Gerotor Rotary Flow Divider" by George H. Morgan, P. E., published by the American Society of Agricultural Engineers, St. Joseph Mich. Replacing the valve type flow divider with a gerotor rotary flow divider during the redesign improved system efficiency.

The original installation ran exessively hot so an oil cooler was added. Even with the oil cooler, the top mowing speed for the intended purpose was in the order of approximately one half mile per hour, which was not a feasible attainment, considering the equipment involved and the costs incurred. After two mowing seasons, this inventor revised the design and the resulting invention now is speed limited by the terrain, not the hydraulic system, to a mowing speed of several miles per hour.

In reviewing the above patents, boom mounts seem quite common. However, in the boom mounts covered in the above patents, the mowers are suspended from the boom so the operator needs to constantly monitor the height of the mower with respect to the ground being mowed. The mower doesn't travel on the ground, it is suspended from the boom, requiring constant attention by the operator. This is not practical for mowing the heavy grass, underbrush and small trees on a levee or in a ditch or waterway at a speed of several miles per hour.

U.S. Pat. No. 3,045,413 by Sheffer is shows a dual mowing approach. However, the circuit shown doesn't work. With none of the valves open, the hydraulic pump, if sufficiently powered, would break, unless a relief valve was added. If both valves to both motors were opened, whichever motor that was the least loaded would use all the oil, and the most loaded motor would stall. There is no arrangement to divide the flow between the motors. If only one valve operated at a time, it is no longer a tandem mowing mechanism. Sheffer mentions water as one of the fluids for operation. To date, none of the agricultural tractor hydraulic systems work on water. Sheffer's patent is dated 1962.

U.S. Pat. No. 3,665,685 by Allard also shows a dual mowing approach. He proposes two hydraulic mowers in series. The circuit he discusses would work for relatively light mowing tasks, such as trimming grass around fences, but he does not have relief valves in his circuit. When two hydraulic motors are in series, the pressure from the pump equal the sum of the pressure drops across each of the two motors. An excess pressure surge, say from the last hydraulic motor in the series hitting an obstacle, could damage that motor, plus the upstream motor in series, plus the original pump. Using hydraulic motors in series, where one can expect to run into obstacles, without relief valves, is an invitation to disaster. In the series circuit, all the pumped oil goes through each of the two motors, with the pressure available divided up between the motors. In a parallel circuit, the oil would be split between the motors, and the pump pressure no longer has to equal the total of the pressure drops across the motor.

This inventor's solution to the inadequate attempts by Sheffer and by Allard will be detailed in this application.

The present invention is a dual mowing arrangement, with two side by side blades, each blade driven by a hydraulic motor, with an improved means of insuring more or less equal blade speeds, independent of blade loading, with the mowing arrangement riding on the ground with minimal operator attention. i.e. as the tractor is mowing, the operator can concentrate on where he is going, and not need to constantly monitor and adjust the boom arrangement. The boom arrangement permits off-set mowing, while the boom/mower connection is such that the mower deck can rise or fall with respect to the boom, so the mower's position with respect to the ground is determined by the wheels and the deck height adjustment. As the present invention allows the mower to follow the contour of the ground being mowed which is different than the ground the tractor wheels are traversing, in rough terrain, the operator is not required to moniter and adjust the boom constantly to allow for changes in relative slope or ground elevation with respect to the vehicle. In the sales literature this inventor has seen, showing boom mounted mowing decks in operation, the operator, when shown, is looking at the mower deck instead of where he is going. That seems an unsafe mowing condition. In the present invention, the operator can focus on where he is going, as opposed to continually monitoring and adjusting the boom so the mower deck is at a proper elevation and orientation with respect to the ground.

There are additional societal benefits far beyond the immediate task at hand. "More than 25,000 people were treated at hospital emergency rooms last year (1991) for injuries related to farm equipment. That was an 11 percent increase over 1990. The majority of 1991 farm injuries were related to tractors, silo loaders, tillage equipment, posthole drivers, mowers, hay processing equipment, and wagons." U.S. Consumer Products Safety Commission. (From the Evansville (Indiana) Courier, Saturday, Aug. 29, 1992, p.3A. Discover column. "25,000 Injured in Farm Accidents Last Year.") "A Sentry Insurance spokesman who insures Farm Equipment Manufactuers Association members said that 90% of his payouts are split between drive line accidents and feed grain auger incidents." The source of these facts is the previously mentioned Amercan Society of Agricultural Engineers Paper No. 921604.

In the present invention, the pump is close coupled to the tractor PTO drive shaft, said pump within the three point hitch to which the boom attaches. This arrangement is an improvement over the long exposed drive shaft one so frequently sees on mowers along the side of the highway.

An additional benefit of a hydraulic driven mower, is that hydraulic drives can have safety interlocks such that if an operator falls off the tractor seat, the hydraulics are shut off. There are sad mowing accidents, on occasion, where the operator fell off the tractor, survived the fall, only to be killed by being run over by mechanically driven mower attachment.

SUMMARY

The invention starts with a Woods, Division of Hesston Corporation, Oregon, Ill. Model 121 commercial two spindle "bush hog" type mower. The PTO drive shaft as well as two drive shafts on the mower, and the gearing arrangements for driving the spindles which drive the mowing blades are removed. A hydraulic motor is directly mounted over each of the two spindles. In this aplication, all pumps and motors referred to are hydraulic pumps and motors.

A relief valve is installed at or in the motor to protect the motor in the event of the blade hitting an obstruction.

A major obstacle to a dual blade hydraulic mower was lack of an efficient, economic way to keep the dual blades, driven by hydraulic motors, at approximately equal speeds.

Three alternatives considered for the present invention are:

1) A" Gerotor" rotary flow divider splitting the flow between the two hydraulic motors operating in parallel;
2) operating the two motors in series, where all the flow from the pump goes through each of the two motors in series; and
3) using a double section pump, each section of equal displacement, each section driving one motor.

The purpose of these alternatives is to insure that in the event one motor is more heavily loaded than the other, the relative blade speeds are more or less equal, until a motor sees sufficient pressure to open a relief valve in or adjacent to the given motor. Otherwise, in a parallel circuit, i.e. where the pump flow is split between two motors, in the event one motor is under more load than the other, the motor with the heavier load tends to stall while the other motor tends to overspeed. Operating the motors in series can cause excessive cumulative pressure drop which causes problems in heavy duty operating conditions.

As the pressure and speed characteristics of gear motors and gear pumps are similar, the parallel circuit with the "Gerotor" flow divider is a balanced design. As the most efficient pressure operating ranges of orbiting "Gerotor" motors is typically approximately half that of gear pumps, (Ref. Eaton Fluid Power Products, Eaton Corp., 15151 Highway 5, Eden Prairie, Minn. 55343, Form no. 11-850-120, February 1980, for typical optimum pressure and speed ranges. Later literature does not convey the information as well. Also ref. Permco, Inc. 1500 Frost Road, Streetsboro, Ohio 44241-0829 Design Engineer's Handbook for typical hydraulic gear pump and motor performances.) using a gear pump, with two orbiting gerotor motors in series, thereby eliminating the "Gerotor" rotary flow divider is also a balanced design. The trade off is that at the 754 to 1000 rpm blade speed listed in the specifications sheet for the "Wood's" 121 mower, the gear motors would be running below their optimum speed for volumetric and mechanical efficiency, and the orbiting gerotor motors would be running at the high end of their recommended speed range for optimum life but have a higher volumetric efficiency. Also, orbiting gerotor motors have a very high mechanical efficiency at dead stop start ups as compared to gear motors. This is desirable in start-ups under load conditions. In the series circuit, relief valves would be highly desirable at or in each of the motors. In the parallel circuit with the gear motors, relief valves are highly desirable at or in each of the gear motors to protect each motor and also at or in the pump to protect the pump. Closed loop hydrostatic drives also can be made to work but are not as economically feasible at the present time.

The preferred embodiment of the present invention employs a double section vane pump, with each of the sections equal in displacement, each section powering an orbiting "Gerotor" motor, each motor having an integral relief valve. The Woods mower literature recommends a blade speed of 1,000 rpm. This is at the upper limit of the recommended speed of an orbiting gerotor motor. Such motors are catagorized in the trade as low speed, relatively high displacement hydraulic motors. Vane motors are typically catagorized as relatively high displacement low pressure as compared to gear pumps. So, by going with a vane pump, double section, each section powering an orbiting gerotor motor, with the displacement of the pump such that the motors are sized to keep the pressure down, the result is an efficient hydralic circuit driving the mower blades at the required rpm. The integral relief valve in the motor simplifies the circuitry by eliminating hoses and connections.

The mower is further modified by adding a dual front wheel arrangement with an eye that serves as the attachment point for the clevis pinned in one end of the backhoe. The hydraulic hoses are then run from pump to the motors and then from the motors back to a return line filter then to a reservoir. In one of the emboidments, a "Gerotor" flow divider is upstream of the motors. There are a variety of hydraulic circuitry arrangements for providing oil flow at the pressure required. For running the hydraulic motors in parallel, a rotary gerotor flow divider divides the flow more or less equally between the two hydraulic motors so the blades speeds are more or less equal from one hydraulic motor to the next. In one of the embodiments, to be discussed in the detailed description, a double section vane pump is used as an alternative to using the gerotor flow divider for a parallel flow arrangement. An added advantage of the vane pump is that they are more efficient than a gear pump at 1,000 rpm. Vane pumps are rarely used on mobile hydraulic applications as the pressure ratings are less than those of gear pumps. The vane pump is used on the preferred embodiment of the invention as its operating characteristics matched those of the orbiting "Gerotor" motors and the combination was more efficient than any alternatives considered.

It is important to minimize heat in the circuitry. The initial circuitry, state of the art, from a prominent Indiana fluid power distributor, did not work, because of excess heat generation encountered in the types of vegetation encountered on levees and in ditches and waterways. Refinements beyond the initial circuitry were required.

An important factor was using SAE rated engine oil as opposed to the recommended hydraulic oil. The better oil, with higher temperature ratings, was a factor in success. Hydrdaulic oil seems to be formulated on the assumption that the hydraulic system is going to be running at around 120 degrees Fahrenheit. As the present invention ran hotter than that with the general purpose type hydraulic oil, the additives were cooking out, the system efficiency decreased, and the oil got even hotter. Switching to an SAE engine oil, which has a much higher temperature rating, helped the system efficiency, reducing the heat generated.

A valve type flow divider was recommended as state of the art to divide the flow between the two motors in parallel so as to have approximately equal blade speeds from one motor to the next. According to the circuit proposer, with the valve type flow divider, the blades would stay at equal speeds in the event one blade was more heavily loaded than the other. What the circuit proposer didn't or couldn't say, was that in the event of unequal blade loads, heat would be generated. Excess heat was encountered. So a "Gerotor" rotary flow divider was used, that was considerably more efficient. Apparently, no one had ever been successful with a heavy duty rough terrain twin spindle hydraulic mower before because they believed the experts on how to do it.

An extension to the front of the mower frame was added. This extension included two additional wheels, bringing the wheel total to four wheels. Two wheels were on the leading edge of the mower and two were on the trailing edge of the mower.

The backhoe boom was mounted on the "Ford" tractor by way of a thre point hitch arrangment and the modified mower deck was attached to the backhoe boom with a loose, non rigid connection. This connection consisted of an eye on the mower deck extension and a clevis on the end of the backhoe boom. This connection had sufficient play that the mower deck could ride on the ground, and the ground elevation and slope with respect to the vehicle could vary, without the operator having to adjust the boom.

The backhoe boom does several things. It improves total vehicle maneuverability, providing short turning radii to permit turns on the top of the levee as well as minimizing the necessity of driving onto farmland adjacent to the levee. The backhoe boom also permits off-set mowing, which is advantageous at times when mowing levees, ditches, and waterways. The backhoe boom connection arrangements to the mower permit the operator to focus on where he is going, and to concentrate on driving on the rough terrain, dragging the mower directly behind him. The backhoe boom was modified to match the three point hitch used on the tractor. This inventor does not know of anyone else every mounting a backhoe boom on a tractor with a three point hitch.

The problem of timing the blades, so they would not interfere which each other, was solved by cutting the tips off, so the blades were short enough so the blade tips wouldn't hit each other. Even though there is some clearance between the blade tips, the normal bounce and jounce associated with rough terrain mowing on levees, in ditches, and on waterways, as a practical matter there was not a noticeable line of uncut grass. The blades were left long enough the grass still was cut properly. The only limit to the speed was the operator's judgement on what was a safe speed on the rough levee, waterway, or ditch terrain. Normally this worked out to several miles an hour.

The inventor discovered, from the field trials a smaller tractor than the "Ford 8730 Powershift" was unable to drag the mower attachment through the underbrush.

DRAWING FIGURES

FIG. 1 shows the invention in the preferred embodiment.

FIG. 1a shows a close-up of the clevis/pin connection.

FIG. 1b shows a close-up the three hitch connection.

FIG. 2 shows the hydraulic system in a parallel embodiment using graphic symbols, including the more common ANSI graphic symbols from the American National Standards Institute for use on fluid power drawings.

FIG. 3 shows the hydraulic system in a series embodiment using graphic symbols, inclluding the more common ANSI graphic symbols from the American National Standards Institute for use on fluid power drawings.

FIG. 4 shows the hydraulic system in the preferred parallel embodiment using graphic symbols, including the more common ANSI graphic symbols from the American National Standards Institue for use on fluid power drawings.

FIG. 5 shows a mower leading edge/blade ratio for cutting efficiency.

REFERENCE NUMERALS IN DRAWINGS 1. rough terrain mower assembly
2. backhoe boom
2A. clevis pin
3. blade
4. mower
6. motor
8. relief valve
10. coupling
12. oil reservoir
14. pump
15. double section vane pump
16. intake line filter
18. return line filter
20. drive shaft
22. hydraulic pressure line
24. hydraulic return line
25. pump intake line
26. oil cooler
28. eye
30. clevis
32. frame extention
34. leading wheel
36. trailing wheel
38. flow divider
40. mower leading edge
43. tractor
44. three point hitch

DETAIL DESCRIPTION WITH RESPECT TO DRAWINGS

Referring to FIG. 1, the preferred embodiment of the invention, is shown as a rough terrain mower assembly 1, which includes a backhoe boom 2, a mower 4, and a variety of hydraulic components which will be discussed in the description that follows.

The mower 4 includes a frame extension 32 which includes leading wheels 34. The frame extension 32 with the leading wheels 34 is an addition to the original Woods twin spindle mower.

The backhoe boom 2 is modified to attach to a three point hitch 44, said three point hitch 44 as typically used with agricultural tractors and not in in itself inventive. While there is nothing unique about mechanically adapting anything to fit said three point hitch 44, the idea of attaching a backhoe boom 2 to the three point hitch 44 is novel and not something the inventor has seen done before. A clevis 30 attaches to the backhoe boom 2 by means of a clevis pin 2A.

The mower 4 includes an eye 28, which accepts the clevis 30 which attaches to the backhoe boom 2 by means of the clevis pin 2A. This means of attachment permits some slack which allows the mower 4, which includes trailing wheels 36 as well as the frame extension 32 which includes the leading wheels 34, to ride on the ground as opposed to the mower 4 being rigidly mounted to, and suspended from, the backhoe boom 2. This is an important detail. This allows the operator in the tractor to watch where he is going, as opposed to having to look back over his shoulder, or to one side, to monitor the height of a mower with respect to the ground while constantly adjusting a boom elevation to adjust for changing ground contours.

The backhoe boom 2 has all the degrees of movement associated with backhoe booms, up and down, in and out, and left to right, which permits placement of the mower 4 on either side of the towing tractor or behind the tractor. This permits quite of variety of mowing cuts, including ditches, levees, and roadways. While the backhoe boom 2 in itself is not inventive, its connection to the mower 4 as well as the connection to the tractor 43 by way of the three point hitch 44 does seem inventive to this inventor. The joining of the backhoe boom 2 to the three point hitch 44 forms a protective frame around a double section vane pump 15 which is connected to a drive shaft 20 by a coupling 10.

Refer to FIG. 4. for the preferred embodiment of the hydraulic system. Each section of a two section vane pump 15, drives a motor 6. Each motor 6 contains a relief valve 8. In the preferred embodiment an HB series orbiting "Gerotor" motor with integral relief valve as manufactured by White Hydraulics of Hopkinsville, Ky. is used to power each blade 42. An oil cooler 26 is optional, as is an intake line filter 16 and a return line filter 18. There is also an oil reservoir 12. Pump intake lines 25 and hydraulic return lines 24 are shown with arrows indicating direction of oil flow. There are also hydraulic pressure lines 22 in FIG. 4.

FIG. 1 illustrates the locations of these components, except for an intake line filter 16 and a return line filter 18, both of which can be located in a variety of places, including the oil reservoir 12.

FIG. 2 shows an alternate embodiment that differs from FIG. 4 in that a pump 14, which is a single section pump, drives two motors 6 in parallel. As said motors 6 are in parallel, some means of dividing the flow is required. Otherwise, the motor with the lightest load will tend to overspeed while the motor with the heaviest load will tend to stall. A rotary flow divider, 38 solves this problem. A "Gerotor" rotary flow divider as manufactured by White Hydraulics of Hopkinsville, Ky. was used in this alternate embodiment as a replacement for a valve type flow divider, which was the heretofore state of the art. A rotary flow divider divides the horsepower as required by the differing loads on the motors. A valve type flow divider doesn't. This turned out to be quite critical in successful operation of the hydraulic system as shown in FIG. 2. FIG. 2 includes the the intake line filter 16, the return line filter 18, the hydraulic pressure line 22, the hydraulic return line 24, the pump intake line 25, the oil cooler 26, relief valves 8, and the reservoir 12. Directional arrow heads indicate the direction of oil flow to assist in understanding the circuit.

FIG. 3 shows an alternate embodiment that differs from FIG. 2 in that two motors 6 are run in series, to eliminate the rotary flow divider as used in the FIG. 2 embodiment. The cumulative pressure drops across the motors 6, in series, makes the FIG. 3 embodiment of the present invention less desirable than preferred embodiment as shown in FIG. 4.

The state of the art in tractor hydraulics is gear pumps and gear motors. They don't work very efficiently at the speeds involved. The drive shaft 20 operates at 1,000 rpm, which is not an optimum speed for hydraulic gear pumps or motors. Most tractors have an alternative drive shaft speed with a 540 rpm range. This is even less desirable than a 1,000 rpm range. A vane pump works much more efficiently at 1,000 rpm a gear pump, which is why it is the choice in the preferred embodiment. By using a double pump, a flow dividing arrangment such as is used in FIG. 2 is avoided in FIG. 4.

FIG. 5 illustrates the preferred embodiment of the invention where a mower leading edge 40 is at twice the height of a blade 3. The mower leading edge 40 bends the grass forward, putting the grass in tension, which reduces the torque required by the blade 3 to cut the grass. That has not been seen on previous mowers by this inventor.

The backhoe boom 2 is operated by the tractor hydraulic system, including typical directional valves. This is not novel so such operation is not detailed.

The drive shaft 20, which powers the pump 15 through the coupling 10 is from the tractor PTO which is a part of the tractor which is not inventive, so is not given a reference number.

Hydraulic pressure lines 22, hydraulic return lines 24, and pump intake lines 25 are indicated in the various figures, along with direction indicators where appropriate to assist in understanding the embodiment of the invention shown.

Although the description above contains many specificities, these should not be construed as limiting the scope of the invention but as merely providing illustrations of some of the presently preferred embodiment of this invention. For example, a back hoe boom, modified by removing the bucket is used to drag the mower through the grass and trees. A similar boom, that wasn't a surplus backhoe boom would serve the same purpose. While gear pumps are referred to as a specificity, piston pumps would also do the job.

Thus the scope of the invention should be determined by the appended claims and their legal equivalents, rather than by the examples given.

I claim:

1. A rough terrain mower assembly comprising:

a) a mower and a boom which can be towed by a vehicle; wherein the assembly will tolerate variations in ground elevations between said tractor and said mower, and a connecting means of connecting said mower and said boom;

b) said mower having a frame with a front end and a rear end, at least one blade mounted to said frame, and at least one hydraulic motor mounted on said frame to rotate said at least one blade, said mower supported by at least two wheels mounted on said front end and at least two wheels mounted on said rear end, c) said boom having first and second sections pivotally connected to each other, each section of said boom having a forward end and a rearward end, wherein the forward end of said first section is connectable to said vehicle, the rearward end of said section is connectable to said mower, and the rearward end of said first section is pivotally connected to the forward end of said second section; and d) said connecting means for connecting said mower to said boom comprising an eye bolt means secured to said front end of said frame extending forwardly thereof, a pin means extending through an aperture on rearward end of said second section of said boom, and a clevis means for connecting said pin means and said eye bolt means together.

2. A rough terrain mower assembly of claim 1 further comprising a hydraulic system including at least one hydraulic motor and a vane pump driven by said vehicle PTO shaft.

3. A rough terrain mower assembly of claim 2 wherein said hydraulic system includes a rotary flow divider to distribute flow among said motors.

4. A rough terrain mower assembly of claim 3 wherein said hydraulic motors are orbiting "Gerotor" type hydraulic motors.

5. A rough terrain mower assembly of claim 1 wherein said mower has a mower deck and in which said at least one blade has an elevation that is one half the distance of the leading edge of the mower deck in relation to the ground.

* * * * *